Dec. 14, 1965     H. OSSWALD     3,223,021
APPARATUS FOR PRESSURIZED ROASTING
OF COFFEE, COCOA AND THE LIKE
Filed March 2, 1961
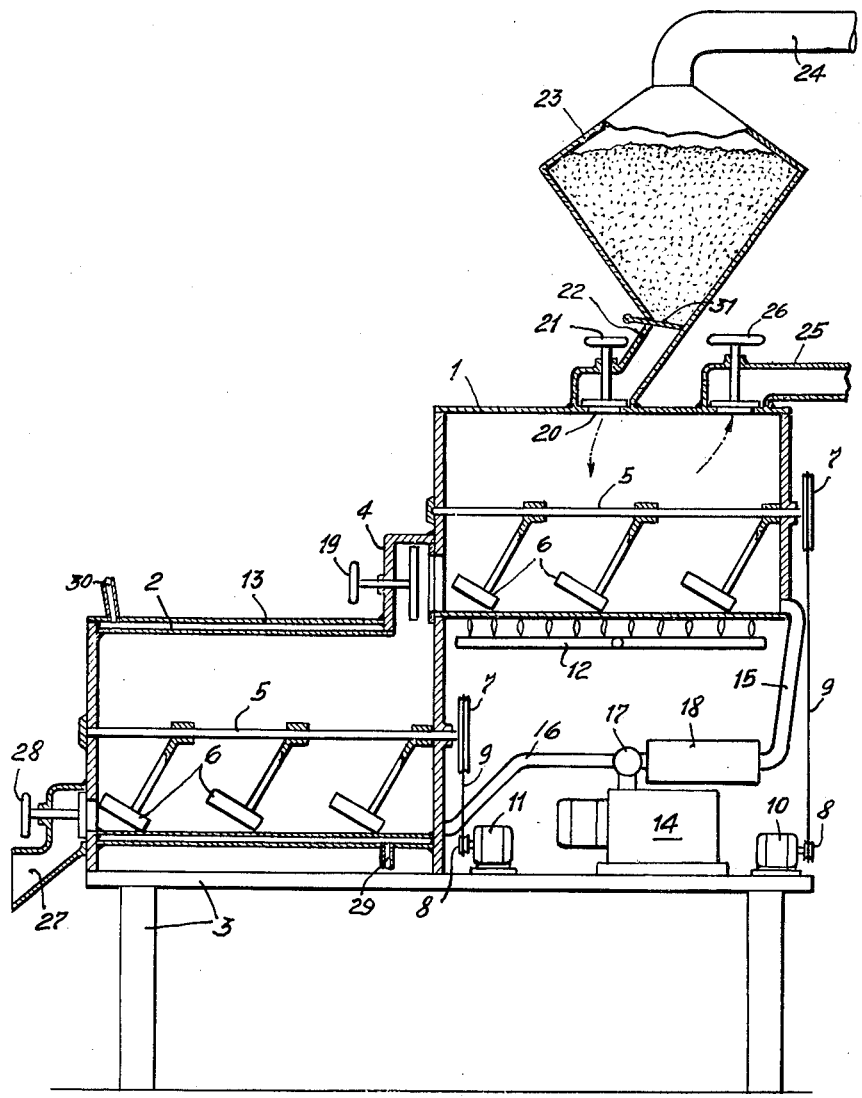
INVENTOR
*Hans Osswald*
BY *Lowry & Rinehart*
ATTORNEYS

United States Patent Office 3,223,021  
Patented Dec. 14, 1965

3,223,021
APPARATUS FOR PRESSURIZED ROASTING OF COFFEE, COCOA AND THE LIKE
Hans Osswald, Kreuzplatz 16, Zurich, Switzerland
Filed Mar. 2, 1961, Ser. No. 92,852
2 Claims. (Cl. 99—236)

The apparatus disclosed by my invention aims at substantially increasing the quality, yield, stability and aroma content of the roasting goods and at the same time reduce to a minimum the loss of weight caused by the roasting process.

It has been proposed before at various occasions to roast the goods in a hermetically closable container under the selective action of heat and cold as well as of excess pressure and vacuum. A great disadvantage of the roasting processes employed so far under hermetic seal is the fact that the husks chipping off the beans when roasting coffee, burn up in the process of roasting whereby the quality and aroma are heavily impaired. A further disadvantage is the excessive loss of aroma caused by the fact that it is not possible to interrupt the roasting process by cooling the roasting drum without previously letting off the excess pressure prevailing in said drum, whereby all the aroma matter escaping with hot air and steam is wasted and whereby further aroma matter on the roasting goods may volatilize and escape by reason of the pressure drop. In particular in the case of roasting apparatus in which cooling has to be effected by injection of a coolant, a pressure rise cannot be avoided so that for safety reasons the pressure valve has to be opened whereby valuable aromatic matter is wasted with the escaping steam as well as by absorption in the non-evaporated coolant. Further, the roasting apparatus known so far are unsatisfactory from an economic point of view as continuous roasting is practically impossible.

My present invention relates to an apparatus for roasting coffee in particular. For the purpose of interrupting the roasting process and of canceling the excess pressure built up in said process by the expansion of steam, ethereal and aromatic components of the roasting goods, the latter in this method are subjected to an indirect cold radiation issuing from a container wall, the transition from roasting to cooling is made continuous, and the goods are held constantly under hermetic seal during the cooling stage.

The apparatus is distinguished by the fact that the container comprises a cooling element through which flows a coolant and from which cold may be radiated on to the roasting goods in the hermetically closed container for the purpose of interrupting or stopping the roasting process.

When roasting coffee, the coffee may be heated in the heatable container either openly or, under vacuum first, then cleaned, and the silver skin-like husks may be caused to chip off from the beans. The drum then is further heated while feeding air thereinto to blow out same for the purpose of carrying away the chipped-off husks. The roasting process proper then is carried out, while the valves are closed, under further heating and pressure increase. After terminating said process proper, the valve controlling the connection-opening of the drum is opened, and the batch of roasting goods is conveyed from the heating drum into the cooling drum while making use of the pressure head between the two drums. The heating drum then is again charged with raw coffee which during the cooling stage and the discharge of the previously roasted coffee is subjected to the husking and roasting process.

The apparatus shown comprises two hermetically closable drums 1 and 2 which are mounted at different elevations on a table 3 and which are interconnected by transition member 4. In the two drums are provided stirring means 6 which are rotatable about the drum axes 5 and of which each is driven by an electric motor 10 or 11 through a V-belt drive 7, 8 and 9. Drum 1, which is situated at a higher elevation, is heatable by gas heating means 12, but alternatively may be formed as an electrically heatable roasting drum. Drum 2, which is situated at a lower level, is provided with a cooling-water jacket 13. 14 is a compressor which through conduits 15, 16 is connected to the drums 1 and 2. By actuating a multiple-way cock 17, either of the two drums may be fed with compressed air or be evacuated, the air supplied to drum 1 being heatable by means of a heating jacket 18. The connection opening formed by the transition member 4 and which is opposite the air inlet opening, of the drum 1, is controlled by a manually operable valve 19. 20 is the opening through which the roasting drum is charged and which is controlled by a manually operable valve 21. Said opening 20 is connected through a supply member 22 to a reservoir 23 for making ready for discharge a certain quantity of raw coffee to be roasted, which quantity is in accordance with the capacity of the roasting drum. To the top of the reservoir is connected a feed pipe 24 for the raw coffee. 25 is the husk-discharging member having a roasting-drum opening hermetically sealable by a valve 26. The cooling drum 2 on the side opposite the air inlet opening thereof is provided with an outlet 27 for the roasted and cooled goods, which outlet is hermetically sealable by a manually operable valve 28. 29 is the inlet, and 30 the outlet for the cooling water of jacket 13. 31 is a slide valve in the lower portion of reservoir 23.

The mode of operation of the roasting apparatus shown and described is as follows:

After having started motor 10 which drives the stirring means 6 of the roasting drum, the later is heated up while the valves 19, 21 are closed, and while valve 26 may be closed or open. When valve 21 has been opened, slide valve 31 is opened so that a batch of raw coffee drops into the roasting drum 1. The compressor 14 is started after the valves 21 and 26 have been closed. When actuating the multiple-way cock 17, a vacuum is produced in roasting drum 1 for approximately two minutes. As the boiling temperature is surpassed, the water contained in the beans is evaporated and the steam escapes into the drum. At the same time, the coffee beans expand due to the vacuum and rupture their outer husks which, owing to the revolution of the goods through the stirring means, become detached from the beans. Valve 26 then is opened, and compressor 14 is reset to compressed air by operating the cock 17. Compressed air, preheated or not, flows into the roasting drum 1. In this manner, the drum is scavenged, whereby the husks are removed from the drum through the conduit 25. The flow of compressed air then is stopped, and through pipe 16 and by means of cock 17 a maximum vacuum is attained in the cooling drum. Valve 28 remains closed, and the compressor is stopped after having attained a vacuum. Afterwards valve 26 is closed so that the roasting process proceeds in the hermetically sealed space. Motor 11 is started and drives the stirring means in the cooling drum 2 and circulates the cooling water. When opening the connection valve 19, the roasting process is terminated. On account of the high pressure head and the temperature differences between the two drums, the goods are sucked or drawn into the cooling drum. It is not absolutely necessary to keep the cooling drum 2 under vacuum.

The connecting valve 19 then is closed again. By opening the valve 21, the next batch of coffee is delivered into the roasting drum, and the reservoir is refilled after the valve 21 has been closed. During the roasting process of the second charge, which is subsequently carried out, the roasted coffee may be left in the cooling drum 2 and be cooled, under airtight conditions, while the pressure drops gradually down. During such cooling step, no aromatic matter can escape but, in the contrary, the goods reabsorb them. After the first batch of goods has cooled down, the cooled roasted coffee may be discharged by opening the valve 28. After reclosing the latter, the maximum vacuum is reproduced and the apparatus stopped. Then the connecting valve 19 is opened and the roasting process of the second batch is interrupted, whereupon the latter is discharged into the cooling drum. After closing the connecting valve 19, the roasting drum is recharged by opening the valve 21. Further, the various operational stages described above are carried through continuously and simultaneously in both drums without any substantial heat loss. The roasting apparatus described also may be constructed for semi-automatic or fully automatic operation in that all the valves and switches may be remotely actuated from a desk.

The invention disclosed above aims at directly interrupting the final roasting process without any introduction of water or other coolants into the hermetically closed roasting drum, and at bringing about a contraction to the original shape of the goods when the excess pressure produced in the drum by steam, ethereal and aromatic components is relieved. The contraction and the re-introduction of the ethereal and aromatic substances and the removal of the excess pressure thus are brought about by indirect cooling, namely by the coolant flowing through the exterior jacket of the roasting drum or through cooling-chamber coils (not shown) built into the drum. When the cooling is effected in a second drum, as in the example set forth above, the transport of the coffee from one drum into the other drum takes place under an airtight seal and under vacuum, and not before the valve in the connecting line between the two drums has been opened.

The roasting process and the subsequent cooling treatment also could be carried out in a single drum and in tandem fashion. The coolant water would have to be drained prior to roasting and be re-introduced into the cooling jacket for the purpose of cooling the goods, the latter remaining under hermetic seal. Such modification, however, does not avoid a heat loss and normally would be adopted only in cases where limited quantities of coffee have to be roasted.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. An apparatus for roasting coffee and cocoa beans comprising two horizontally disposed vertically offset drums including an upper roasting drum and a lower cooling drum, a transition member interconnecting end portions of said drums, a valve in said transition member normally sealing said drums relative to each other, means for heating said roasting drum, means for cooling said cooling drum, a normally sealed bean inlet fitting in said roasting drum, an upper normally sealed husk discharge outlet in said roasting drum, a lower normally closed bean discharge opening in said cooling drum remote from said roasting drum, means for selectively supplying air under pressure to said drums and producing a vacuum therein, said last mentioned means including a connection in the lower part of said roasting drum remote from said transition member and a connection in the lower part of said cooling drum remote from said bean discharge opening, the air supply means including an air compressor, said connections comprising a conduit and a multi-cock in said conduit selectively in communication with the pressure and suction side of the air compressor whereby the roasting drum can be closed hermetically to the bean inlet fitting and also to the husk discharge outlet, and independent valve means controlling the bean inlet fitting and the husk discharge outlet.

2. The apparatus of claim 1 together with separate agitating means in each of said drums.

References Cited by the Examiner
UNITED STATES PATENTS

| | | | |
|---|---|---|---|
| 115,302 | 5/1871 | Galloway | 99—68 |
| 177,592 | 5/1876 | Underwood | 99—68 |
| 278,199 | 5/1883 | Sweeny | 99—236 X |
| 1,237,931 | 8/1917 | Malvezin | 99—68 |
| 1,340,692 | 5/1920 | Wilcox et al. | 99—236 |
| 2,043,443 | 6/1936 | Meyer | 99—68 |
| 2,301,922 | 11/1942 | Atti | 99—236 |
| 2,360,838 | 10/1944 | Atti | 99—236 |
| 2,444,217 | 6/1948 | Armentrout | 99—68 |
| 2,614,043 | 10/1952 | Lenz | 99—68 |
| 2,632,706 | 3/1953 | Montgomery | 99—68 |
| 2,670,937 | 3/1954 | Truesdell. | |

FOREIGN PATENTS

| | | |
|---|---|---|
| 174,577 | 6/1922 | Great Britain. |

CHARLES A. WILLMUTH, *Primary Examiner.*

A. H. WINKELSTEIN, ROBERT E. PULFREY,
*Examiners.*